United States Patent [19]

Finelli et al.

[11] 4,038,256

[45] July 26, 1977

[54] NONSTAINING POLYURETHANE FROM CYCLOALIPHATIC OR ALIPHATIC DIISOCYANATES AND POLYHEXENEDIOL-PHTHALATES

[75] Inventors: Anthony F. Finelli; Jeffrey W. Saracsan, both of Akron, Ohio

[73] Assignee: The Goodyear Tire & Rubber Company, Akron, Ohio

[21] Appl. No.: 634,573

[22] Filed: Nov. 24, 1975

[51] Int. Cl.$^2$ .............................................. C08G 18/10
[52] U.S. Cl. ......................... 260/75 NH; 260/75 NK; 260/77.5 AN
[58] Field of Search ............... 260/77.5 AN, 75 NK, 260/75 NH, 75 NM; 428/425

[56] References Cited

U.S. PATENT DOCUMENTS

| | | | |
|---|---|---|---|
| 2,725,366 | 11/1955 | Seeger et al. | 260/77.5 AN |
| 3,033,825 | 5/1962 | Murphy | 260/77.5 AN |
| 3,297,649 | 1/1967 | Kirschner | 260/75 NH |
| 3,383,366 | 5/1968 | Taub | 260/75 NH |
| 3,554,951 | 1/1971 | Blomeyer et al. | 260/75 NK |
| 3,632,845 | 1/1972 | Brownsword | 260/75 NH |
| 3,813,257 | 5/1974 | West | 428/425 |
| 3,899,467 | 8/1975 | Bonk et al. | 260/77.5 AN |
| 3,905,944 | 9/1975 | Finelli | 260/75 NH |
| 3,926,919 | 12/1975 | Finelli | 260/77.5 AN |
| 3,929,730 | 12/1975 | Graife et al. | 260/77.5 AN |

*Primary Examiner*—Eugene C. Rzucidlo
*Attorney, Agent, or Firm*—F. W. Brunner; J. D. Wolfe

[57] ABSTRACT

Laminates with staining rubber stocks can be made by adhering to the staining rubber stocks a nondiscoloring and nonstaining polyurethane comprising the reaction product of a mol of polyester of 1800 to 3500 molecular weight, 1.3 to 3.2 mols of a cycloaliphatic or an aliphatic diisocyanate and curing with 0.2 to 2.0 mols of an organic diamine or polyol of the nonstaining type, the polyester being polyhexanediol-ortho-phthalate or a blend of 50 to 80 percent of polyhexanediol-ortho-phthalate and 50 to 20 percent of polyhexanediol iso-phthalate.

4 Claims, No Drawings

NONSTAINING POLYURETHANE FROM CYCLOALIPHATIC OR ALIPHATIC DIISOCYANATES AND POLYHEXENEDIOL-PHTHALATES

This invention relates to a method of making a nonstaining, nondiscoloring polyurethane and to said poylurethane and its use. More particularly, this invention relates to the use of a nonstaining, nondiscoloring polyurethane to laminates with staining stocks used in building tires and to said laminate.

U.S. Pat. No. 3,813,257, issued May 28, 1974 describes the formation of laminates of polyurethane and the elastomers generally referred to as polymers of ethylenically unsaturated monomers of 2 to 12 carbons atoms, such as butadiene-styrene rubber, polyisoprene rubber, polychloroprene and butadiene-acrylonitrile rubber. This patent teaches to clean and treat the surface of the polymer of the ethylenic monomer or monomers with chlorine water to enhance the bond strength sufficiently to get laminates having satisfactory peel strength for painting polyurethane sidewalls on a tire.

Unfortunately, the nondiscoloring polyurethanes are readily stained by the conventional compounded tire stocks and consequently, it is necessary to put a barrier stock, usually referred to as a nonstaining coverstrip on the tire at the time the tire is being made to prevent the white sidewall strip from being discolored or stained.

An object of this invention is to provide a polyurethane that is nondiscoloring and nonstaining in contact with the conventional tire staining elastomer stock.

The object of this invention and other advantages are obtained by preparing a polyurethane reaction mixture comprising mixing a mol of a polyhexanediol-o-phthalate of 1800 to 3500 and preferably 2200 to 3000 molecular weight with 1.3 to 3.2 mols of an aliphatic diisocyanate or cycloaliphatic diisocyanate and 0.2 to 2.0 mols of a nonaromatic diamine per mol of available isocyanate (after the reaction with the polyol) either by the prepolymer, the quasi prepolymer or the one shot methods and reacting to give a nonstaining and nondiscoloring polyurethane.

The polyurethane reaction mixture can be reacted in contact with a clean, preferably chlorine water treated, dry elastomer of a polymer of an ethylenically unsaturated monomer or monomers, said monomers having from 2 to 12 carbon atoms to give a laminate. The polyurethane reaction mixture can be brought into contact with the elastomer by spraying, brushing, dipping, swabbing or painting. If the painted strip is to function as a tire sidewall decoration, then color pigments are added to the polyurethane reaction mixture to produce the desired color effect.

It should be appreciated that the low molecular weight polyols, for example, trimethylol propane, trimethylol ethane, 1,4-butanediol, diporpylene glycol may be used to partially or completely replace the nonaromatic diamine of the curative. An organic tin catalyst of the urethane class can be used to advantage to control the rate of reaction when polyols are used as the curing agent, although the usual urethane catalyst can be used with any curative. Di(alkyl)tin-S,S'-bis(alkyl mercaptoalkylate) where alkyl and alkylate radicals contain one to 20 and preferably one to eight carbon atoms, is particularly desired as the tin catalyst for spraying a white sidewall on a tire. Also, when making a white sidewall stripe it is desirable to use white pigments such as titanium dioxide as a filler in the polyurethane reaction mixture.

The nature of this invention can be understood more readily by reference to the following representative examples wherein all parts and percentages are by weight unless otherwise indicated.

EXAMPLE

Several belted blackwalled passanger tires, sizes H78-15 containing a 0.5 inch groove on one side of the tire, but no nonstaining coverstrip, were washed in the groove ring area with methyl ethyl ketone to remove grease, oil, dirt, "bloom" and mold release. Then the groove ring of each tire was masked with tape to form a 0.5 inch wide strip in the groove ring. The 0.5 inch wide strip was brushed with chlorine water containing 0.2 to 0.4 percent available chlorine and after three minutes the chlorine water was removed with a blast of hot air. A three mil cost of elastomeric adhesive prepared from blending a carbon black-polyvinylidene chloride solution in methyl ethyl ketone with a polyurethane reaction mixture was brushed into the 0.5 inch wide strip and allowed to air dry. When the adhesive was essentially tack free, usually three to 30 minutes, a 10-20 mils coat of a nonstaining and nondiscoloring polyurethane reaction mixture containing 10 to 70 parts of $TiO_2$ pigment was applied by spraying or spreading. When the coating was tack free, the masking tape was removed to expose a white sidewall of the tire. This white sidewall did not stain or discolor on standing for several weeks whereas the conventional nondiscoloring polyurethane sidewall showed signs of staining and discoloring when the rubber nonstaining barrier coat was not present. The nonstaining and nondiscoloring polyurethane reaction mixture used above was prepared by mixing 100 parts of a white masterbatch with a mixture of 0.4 parts propyl gallate, 3.6 parts methyl ethyl ketone and 10.6 parts of 20 percent isophorone diamine in methyl ethly ketone and methyl isobutyl ketone. The white masterbatch was prepared by mixing 100 parts of a 50 percent toluene solution of a prepolymer formed by reacting one mol of polyhexanediol-ortho-phthalate of 2000 molecular weight with two mols of a commerical, 4, 4'-dicyclohexyl methane diisocyanate , 20 parts dry titanium dioxide, 20 parts toluene and one part of a phenolic antioxidant.

EXAMPLE I

A prepolymer was prepared from 1000 parts of the polyhexanediol-ortho-phthalate or 2000 molecular weight and 243 parts 4,4'-dicyclohexylmethane diisocyanate available as a mixture of trans/cis isomer under the tradename Hylene W by first degassing the polyester at 80°-95° C. in a resin kettle and then adding the liquid diisocyanate. The mixture was allowed to react for 45 minutes at atmospheric pressure. Vacuum was then applied and the prepolymer was degassed for 30 minutes. The prepolymer analyzed 2.66 percent free NCO. The prepolymer, while still warm was diluted in sufficient warm toluene to give a 50 percent solution of the prepolymer.

PREPARATION OF WHITE SIDEWALL MASTERBATCH

A ball mill was charged with:
 300 parts of the 50 percent toluene prepolymer solution
 60 parts titanium dioxide 3 parts Santowhite powder
63 parts toluene p 3 parts "Epon 828" resin (trademark of Shell Oil Company).

Porcelain balls were added to the container and then the ball mill was sealed and rolled for 18 hours. The white prepolymer was then separated from the balls.

PREPARATION OF DIAMINE EXTENDER SOLUTION

To 100 parts Isophorone diamine (IPDA) was added 100 parts methyl ethyl keton and 300 parts methyl isobutyl ketone. The solution was allowed to stand at least 24 hours before use.

PREPARATION OF TIRE SIDEWALL

The sidewall area of the pneumatic tire to be treated with the polyurethane reaction mixture was first washed with methyl ethyl ketone. The sidewall area is then surface treated with chlorine water containing 0.2 to 0.4 percent available chlorine for 3 to 6 minutes. The water is blown off to leave a dry surface. An adhesive was prepared from 25 parts 50 percent toluene prepolymer solution made from one mol of 3000 molecular weight Caprolactone polyester with two mols Hylene W diisocyanate and at 1.2 percent NCO, 2.6 parts of the IPDA extender solution from above, and 62.5 parts five percent polyvinylidine chloride resin in methyl ethyl ketone. The adhesive was mixed well and then brushed into the desired sidewall area with a nylon brush. The tire sidewall was then masked for spraying the white urethane.

A sprayable recipe was prepared from 50 parts white sidewall masterbatch, five parts methyl ethyl ketone, two parts 10 percent propylgallate in methyl ethyl ketone and 4.2 parts pf the diamine extender solution.

A white sidewall stripe was sprayed on this pneumatic tire using an air gun with a size 30 tip at 20 psi with high atomization pressure. The tire was sprayed while rotating on a turntable. The polyurethane reaction mixture was tack free in four minutes and had a pot life of 23 minutes.

The masking was removed after spraying, leaving the white urethane sidewall to complete its cure at room temperature. The white sidewall had good service life and did not discolor or stain 25 hours Xenon Weatherometer test.

EXAMPLE II

A prepolymer having 2.28 percent free NCO was made by reacting one mol of diethylene glycol orthophthalate of 1270 molecular weight with 2.0 mols of Hylene W. This prepolymer was diluted with sufficient toluene to give a 50 percent solution.

Six hundred parts of the above prepolymer, 60 parts titanium doixide, three parts Santowhite powder and six parts Santocel were mixed to form a white masterbatch. A sprayable polyurethane reaction mixture was made by mixing 50 parts of the white masterbatch with 9.3 parts of a 20 percent solution of isophorone diamine in a blend of 25 percent methyl ethyl ketone and 75 percent methly isobutyl ketone. This sprayable polyurethane mixture was used to spray coat a white side wall strip on a clean staining black radial tire sidewall and was used also to draw down a filn b 0.029 inches thick on a polyethylene panel. These coatings and films were allowed to cure overnight at room temperature and then subjected to physical testing. The results of the tests are tabulated below:

| | |
|---|---|
| Tensile, psi | 1140 |
| Elongation percent | 300 |
| Modulus 100 percent, psi | 790 |
| Xenon Weatherometer, 25 hours | Some yellowing |

These tests indicated that staining resistance is not imparted by the diethylene glycol portion of the polyester.

EXAMPLE III

Prepolymers Nos. 1 and 2 were made. Prepolymer No. 1 was made by reacting a mol of a blend of 50 percent of a 2000 molecular weight polyhexanediol isophthalate and 50 percent of a 2000 molecular weight polyhexanedoil ortho-phthalate with 1.6 mols of Hylene W.

Prepolymer No. 2 was made by reacting a mol of a 2000 molecular weight polyhexanediol isophthalate with 1.6 mols of Hylend W. Each of these prepolymers was diluted 50 percent in toluene. 400 parts of each solution were mixed with parts titanium dioxide, two parts Santowhite powder, the tradename for an antioxidant designated as 4,4'-butylidene-bis-(6-tert-butyl cresol), four parts Santocel, a silicate-type thickening agent, and 46 parts of toluene to form masterbatches Nos. 1 and 2 respectively to give polyurethane reaction mixtures 1 and 2. Fifty parts of each of the masterbatches 1 and 2 were mixed respectively with 0.5 parts of a 10 percent propyl-gallate solution in methyl ketone and 3.63 parts of a 20 percent solution of isophorone diamine in the solvent blend of 25 percent methyl ethyl ketone and 75 percent methyl isobutyl ketone and these were used to draw down film strips and to spray coat a staining black radial tire stock to give it a white sidewall effect. After standing overnight at room temperature, the resulting film and white sidewalls were tested. The result of these tests are shown below on polyurethanes 1 and 2:

| Test | Polyurethane No. 1 | Polyurethane No. 2 |
|---|---|---|
| Tensile, p.s.i. | 1970 | 3540 |
| Ultimate elongation, % | 380 | 350 |
| Modulus | | |
| 100% | 480 | 1960 |
| 300% | 1370 | 3040 |
| Xenon Weatherometer, 25 hours | No change | Very slight browning |

This data indicates blends of at least 50 percent of hexanediol phthalate with from 50 to 20 percent hexane diol isophthalate give white sidewall stocks with satisfactory stain resistance and excellent modulus properties.

When isophorone diisocynate was substituted for Hylene W of Examples I and II, good stain resistance was obtained with similar tensile and modulus properties. Likewise, when isophorone diamine was replaced with diamines such as ethylene diamine, the stain resistance was better than where isophorone diamine or the polyols were used as the curative.

While certain representative embodiments and details have been shown for the purpose of illustrating the invention, it will be apparent to those skilled in this art that various changes and modifications may be made therein without departing from the spirit or scope of the invention.

What is claimed is:

1. In a nondiscoloring polyurethane comprising the reaction product of a mol of a polyester of 1800 to 3500 molecular weight, 1.3 to 3.2 mols of a diisocyanate selected from the group consisting of cycloaliphatic and aliphatic and 0.2 to 2.0 mols of a curative selected from the group consisting of organic diamine having no amino groups attached to a benzenoid carbon atom, and a polyol having a molecular weight less than 500 and mixtures of these the improvement wherein the polyester is polyhexanedoil-ortho-phthalate or a blend of 50 to 80 percent of polyhexanediol-ortho-phthalate and 50 to 20 percent of polyhexanediol isophthalate.

2. The polyurethane of claim 1 wherein the diisocyanate is selected from the group consisting of 4,4'-dicyclohexylmethane diisocyanate and isophorone diisocyanate.

3. The polyurethane of claim 1 wherein the curative is selected from the group consisting of isophorone diamine and ethylene diamine.

4. The polyurethane of claim 1 wherein the polyester has a molecular weight of 2200 to 3000.

* * * * *

UNITED STATES PATENT AND TRADEMARK OFFICE
CERTIFICATE OF CORRECTION

PATENT NO. : 4,038,256
DATED : July 26, 1977
INVENTOR(S) : Anthony F. Finelli and Jeffrey W. Saracsan It is certified that error appears in the above-identified patent and that said Letters Patent are hereby corrected as shown below:

Column 3, Line 2 - Take out "p" after word "toluene".

Column 3, Line 64 - "filn b 0.029 inches" should read --film 0.029--.

Column 4, Line 21 - "solution were mixed with parts titanium dioxide" should read --solution were mixed with 40 parts titanium dioxide--.

Signed and Sealed this

Nineteenth Day of September 1978

[SEAL]

Attest:

RUTH C. MASON
Attesting Officer

DONALD W. BANNER
Commissioner of Patents and Trademarks